United States Patent

[11] 3,626,795

| [72] | Inventor | James C. White<br>Rutherford, N.J. |
|---|---|---|
| [21] | Appl. No. | 857,981 |
| [22] | Filed | Sept. 15, 1969 |
| [45] | Patented | Dec. 14, 1971 |
| [73] | Assignee | Propper Manufacturing Company, Inc. |

[54] GLASS-CUTTING APPARATUS AND METHOD
10 Claims, 4 Drawing Figs.

[52] U.S. Cl..................................................... 83/7,
33/32 D, 83/10, 83/11, 83/407, 104/25
[51] Int. Cl..................................................... B26d 3/08
[50] Field of Search........................................ 83/10, 11,
7, 407; 33/32 D; 104/25; 198/85; 225/96.5, 2

[56] References Cited
UNITED STATES PATENTS

| 1,642,839 | 9/1927 | Chadwick............... | 33/32 D |
| 2,747,280 | 5/1956 | Kurata..................... | 83/10 X |
| 2,948,991 | 8/1960 | Walters et al........... | 225/96.5 |
| 3,485,425 | 12/1969 | Matsusaki............... | 225/96.5 X |

Primary Examiner—James M. Meister
Attorney—Blum, Moscovitz, Friedman & Kaplan

ABSTRACT: A glass-cutting apparatus for subdividing a rectangular sheet of glass into sections of predetermined rectangular configuration and size. A conveyor coacts with a plate which carries a sheet of glass to move the latter along a predetermined path. A pair of glass-cutting assemblies are situated along this path so that each of the assemblies will score an exposed surface of the glass sheet with a given number of straight parallel lines in preparation for subdividing the glass into the smaller sections. The conveyor and glass-supporting structure as well as the pair of glass-cutting units all coact with each other to provide between the glass and one of the glass-cutting units an orientation which is perpendicular to the orientation provided between the glass and the other of the glass-cutting units, so that the lines cut into the glass by one of the cutting units will be perpendicular to the lines cut into the glass by the other of the cutting units.

Patented Dec. 14, 1971

INVENTOR.
JAMES C. WHITE

BY
Blum, Moscovitz, Friedman & Kaplan
ATTORNEYS

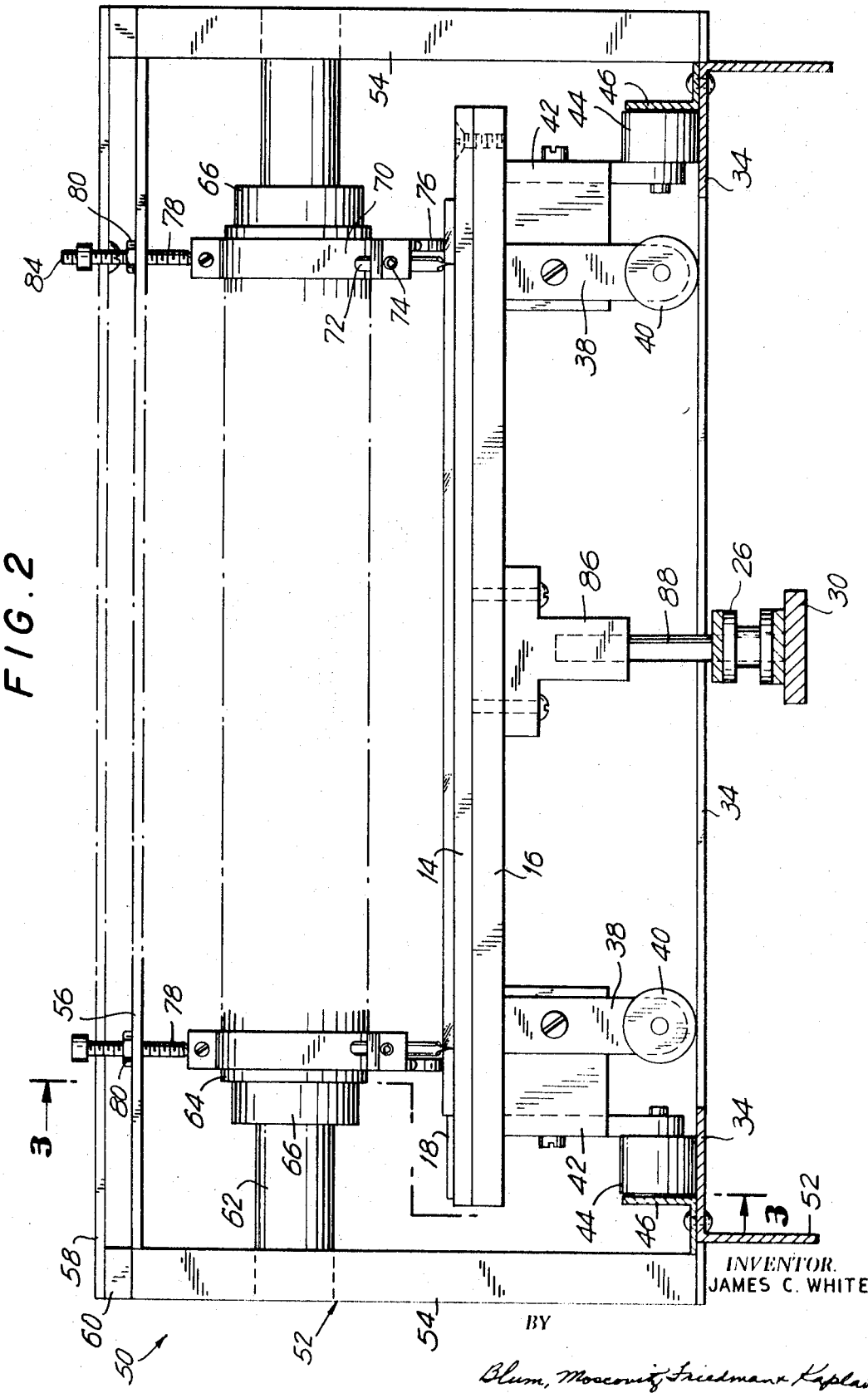

INVENTOR.
JAMES C. WHITE

GLASS-CUTTING APPARATUS AND METHOD

BACKGROUND OF THE INVENTION

The present invention relates to a glass-cutting method and apparatus.

In particular, the invention relates to a glass-cutting apparatus designed to subdivide a sheet of glass into a relatively large number of rectangular glass sections. For example, glass slides used for examining specimens under microscopes are derived from larger sheets of glass which are cut so as to be subdivided into the smaller rectangular sections which form the glass slides.

At the present time such subdivision of glass into smaller rectangular sections is carried out primarily through manual operations so that the smaller sections of glass are achieved only after time-consuming manual operations are performed. Thus, it is known to manually displace a glass sheet with respect to a given glass cutting unit which will score a plurality of straight parallel lines into a surface of the sheet in preparation for subdividing thereof. The sheet which has been scored in this way is then manually turned through 90° before being displaced with respect to a second cutting unit which has glass-cutting components spaced from each other by distances which will determine one dimension of the smaller glass sections while the first glass-cutting unit has its glass-cutting components spaced from each other by distances which will determine the other of the dimensions of the smaller glass sections. These manual operations are time consuming and expensive. Moreover, because these operations are performed manually the cutting of the glass does not always take place with the high precision which is desired.

After the glass has been cut with two sets of mutually perpendicular score lines, it is very readily broken into the smaller sections in a well-known manner.

SUMMARY OF THE INVENTION

It is accordingly a primary object of the present invention to provide a glass-cutting apparatus which will to a very great extent reduce the manual operations required in connection with achieving small sections of glass from a larger sheet.

In particular, it is an object of the invention to provide an apparatus which will eliminate those previously required manual operations used for displacing the glass in mutually perpendicular directions with respect to the pair of glass-cutting units.

A further object of the present invention is to provide an apparatus of this type which will operate continuously so that a glass sheet which is to be subdivided is maintained in substantially continuous movement throughout the operations performed in connection with scoring a surface of the glass sheet with mutually perpendicular sets of parallel score lines.

Yet another object of the present invention is to provide an apparatus which will reliably maintain a glass sheet in precisely determined locations with respect to a pair of glass-cutting units to reliably achieve precisely dimensioned smaller glass sections.

Thus, it is an object of the invention to provide an apparatus which will greatly increase the output as compared with the output achieved by the previous known substantially manual operations.

It is also an object of the invention to provide an apparatus which is of relatively simple rugged construction capable of operating reliably to achieve the desired results and also capable of simultaneously working with a plurality of sheets of glass at various different stages in the glass-cutting treatment thereof so as to achieve a high output.

Among the objects of the present invention is also the provision of an apparatus which will require only manual introduction of a glass sheet into the apparatus and manual removal of the glass sheet from the apparatus, with all other operations being automatically performed while the glass is maintained in continuous movement.

It is also an object of the present invention to provide a method which enables a glass sheet to be maintained in continuous movement during cutting of mutually perpendicular sets of score lines in the sheet.

In accordance with the invention a support means carries a glass sheet which is to be subdivided into smaller sections. A conveyor means coacts with the support means for conveying the latter and a sheet carried thereby along a predetermined path. A pair of glass-cutting means are located along this path with each of the glass-cutting means coacting with an exposed surface of the sheet of glass to provide a plurality of parallel straight cutting lines therein as the glass moves with the support means with respect to the cutting means. The conveyor means, support means, and pair of cutting means all coact to provide between the support means and one of the glass-cutting means an orientation which is perpendicular to that which the support means has with respect to the other of the glass cutting means, so that in this way when the glass moves with respect to one of the glass-cutting means the score lines cut into the glass from the latter cutting means will be perpendicular to those which are cut into the glass by the other cutting means.

BRIEF DESCRIPTION OF DRAWINGS

The invention is illustrated by way of example in the accompanying drawings which form part of this application and in which:

FIG. 2 is a partly sectional elevation taken along line 2—2 of FIG. 1 in the direction of the arrows and showing the structure at a scale which is considerably enlarged as compared to FIG. 1;

DESCRIPTION OF PREFERRED EMBODIMENTS

Figure 1:
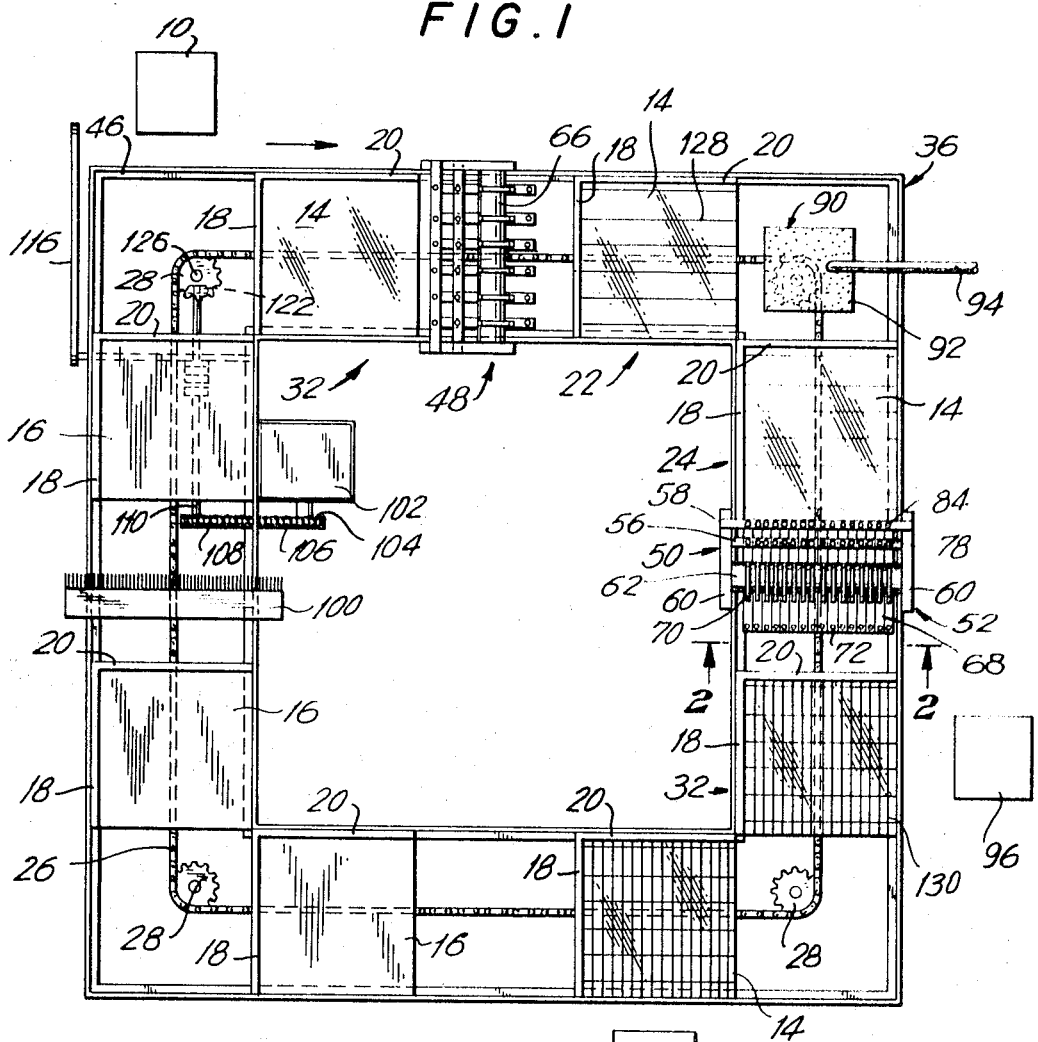
FIG. 1 is a top plan view of a glass-cutting apparatus of the invention.

Referring now to the drawings and to FIG. 1 in particular, there is schematically illustrated in the upper left portion of FIG. 1 a supply or loading station 10 where an operator is located for supplying to the apparatus of the invention glass sheets which are to be cut. These sheets 14 may simply take the form of square sheets of clear glass of the type used in glass slides, for example. The glass sheet 14 is placed by the operator at the station 10 on a support means which takes the form of a substantially rigid flat supporting plate 16 shown most clearly in FIGS. 2 and 3. This support means 16 carries at its upper surface, which directly engages the glass sheet 14, a pair of stop means 18 and 20 which are mutually perpendicular, as is apparent from FIG. 1. These stop means 18 and 20 each take the form of a flat strip the thickness of which is less than the thickness of the glass 14. When the operator places the glass 14 on the support plate 16 the operator makes certain that the edges of the sheet 14 adjacent the pair of stop means 18 and 20 respectively engage the latter.

The support means 16 is acted upon by a conveyor means which conveys this support means along a predetermined path. In the illustrated example this path has a pair of mutually perpendicular portions 22 and 24. The conveyor means includes an endless sprocket chain 26 which is guided by rotary sprockets 28 of the conveyor means for movement along an endless path which is of substantially square configuration, as is apparent from FIG. 1. The several sprockets 28 are fixed to shafts which are supported for rotary movement in any suitable manner. The parts of the endless chain 26 which extend between the sprockets 28 are respectively supported by flat bars 30 along which the chain can slide while being supported against any sag between the rotary sprockets.

The endless chain 26 extends between four sets of parallel tracks 32 which are arranged along the square path. These tracks 32 each include a pair of rails 34, and FIG. 2 shows the pair of rails 34 which form the right track 32 of FIG. 1 and which extend along the portion 24 of the path of movement provided by the conveyor means. However, there is also visible in FIG. 2 the outer rail 34 of the part of the track 32 located adjacent the station 10, the part of this track which is illustrated in FIG. 2 being located at the junction 36 between the portions 22 and 24 of the path.

The support plate 16 carries at the region of its four corners depending brackets which support for free rotary movement two sets of rollers, the rollers of one set being perpendicular to those of the other set.

FIG. 2 illustrates at one pair of corners of the plate 16 depending brackets 38 which respectively support for rotary movement a pair of rollers 40 of that set which engages rails 34 which extend horizontally in FIG. 1. These corners are also provided with additional brackets 42 which carry rollers 44 of the second set, and these are the rollers which engage the tracks 34 which extend along the portion 24 of the path as well as the opposed parallel portion of the path shown at the left of FIG. 1.

As is apparent from FIG. 2, the several rails 34 respectively fixedly carry angle members 46 which engage the outer ends of the rollers so that in this way the support means 16 is very precisely guided for movement along the predetermined endless path.

The pair of mutually perpendicular path portions 22 and 24 are respectively provided with a pair of glass-cutting means 48 and 50. The pair of glass-cutting means 48 and 50 are of the same construction, the only difference being that in the illustrated example the glass-cutting means 50 is provided with a larger number of glass cutters than the glass-cutting means 48. Thus, although the details of the glass-cutting means 50 are illustrated in FIGS. 2 and 3, it is to be understood that the glass-cutting means 48 is of the same construction but simply has a smaller number of glass cutters spaced from each other by a distance greater than the larger number of glass cutters.

Figure 3:
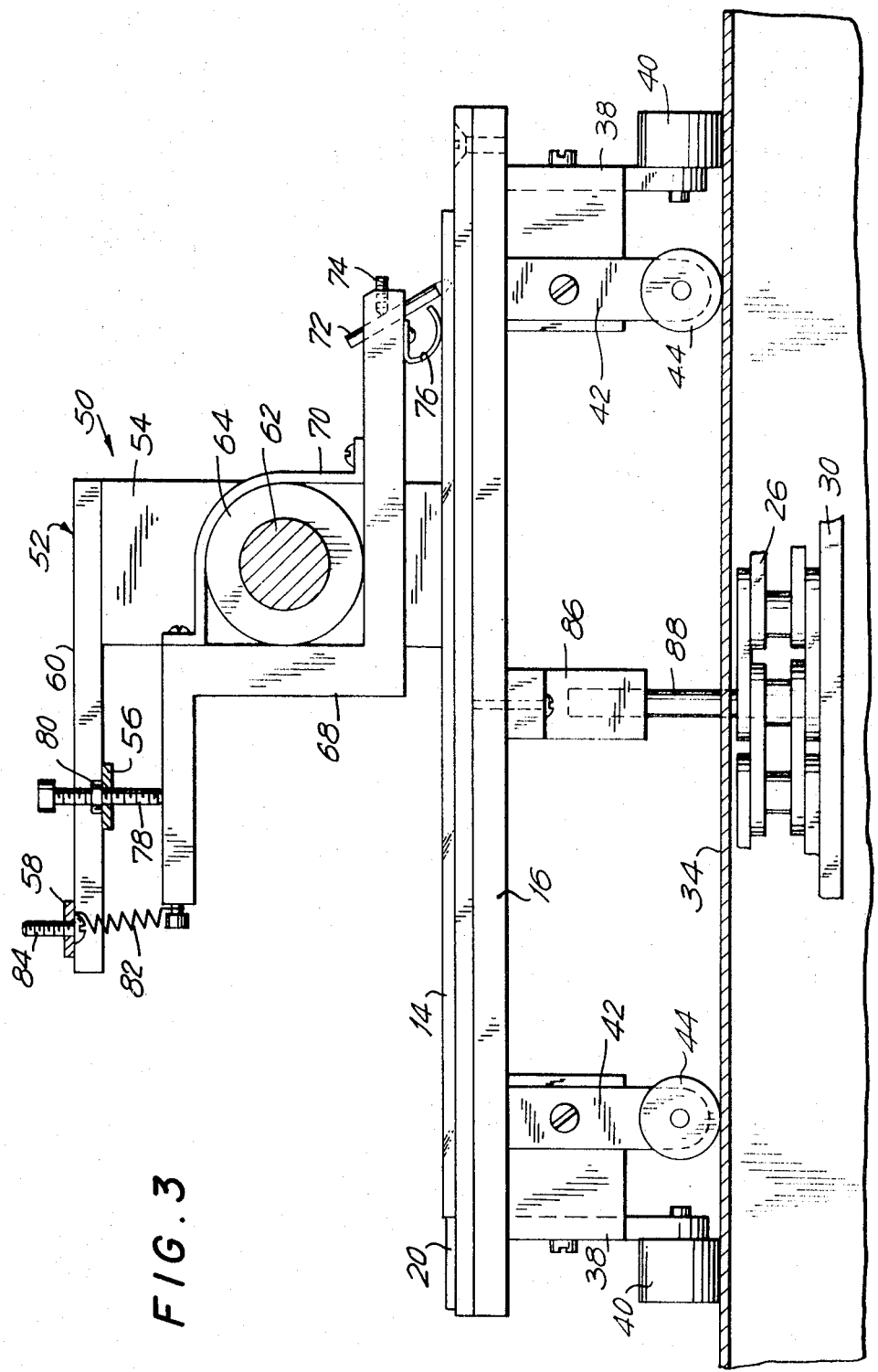
FIG. 3 is a partly sectional fragmentary side elevation taken along line 3—3 of FIG. 2 in the direction of the arrows.

Referring to FIGS. 2 and 3, it will be seen that the frame 52 carries a pair of upstanding substantially rigid supports 54 which are interconnected at their top ends by transversely extending parallel support bars 56 and 58 the central portions of which are shown in phantom lines in FIG. 2. Thus, the pair of standards 54 fixedly carry at their top ends elongated support bars 60 which in turn fixedly carry at their upper surfaces the transverse bar 58 and at their lower surfaces the transverse bar 56 offset with respect to the bar 58 in the manner most clearly apparent from FIG. 3.

A lower transverse bar 62 of circular cross section extends between and is directly carried by the standards 54, and a series of rings 64 are supported for free rotary movement on the bar 62. Suitable collars 66 (FIG. 2) are situated on the bar 62 between the several coaxial rings 64 through which the rod 62 extends, so that these collars 66 form spacer sleeves for determining the spacing between the successive rings 64.

Each ring 64 has clamped to the exterior thereof a stepped bar 68 of the configuration most clearly apparent from FIG. 3. Each bar 68 is removably fixed with a clamping strip 70 which extends around the ring 64 so as to tightly clamp the stepped bar 68 thereto in the manner shown in FIG. 3. Each bar 68 is formed at its lower from end with a diagonal opening through which a cutter 72 of known construction extends, and each cutter 72 is fixed in the diagonal bore at the lower free end of the bar 68 in an adjustable manner by a set screw 74. Each cutter 72 may terminate in a diamond cutting point or may have a hardened steel or carbide wheel well known in the art for cutting purposes. The bar 68 carries at the region of a side surface thereof and at its lowermost surface adjacent to the cutter 72 a curved leaf spring 76 which bears against the top surface of the glass sheet 14 beside the cutting line which is scored into the sheet by each cutter 72.

While the cutter 72 can have its position with respect to the bar 68 adjusted by way of the set screw 74, the structure also is capable of adjusting the position of the bar 68 inasmuch as the ring 64 to which it is clamped is freely turnable on the transverse bar 62. For this purpose the transverse bar 56 carries over each of the stepped bars 68 a stop screw 78 extending adjustably through a threaded bore in the bar 56 and held in its adjusted position by a lock nut 80. At its rear end each bar 68 is connected with a tensioned coil spring 82 fixed at its top end to a screw 84 carried by the bar 58. Thus, the several springs 82 will respectively urge the several bars 68 against the bottom ends of the stop screws 78 so that in this way the positions of the cutting ends of the cutter 72 with respect to the upper surface of the glass sheet 14 can be regulated while at the same time enabling the entire cutting assembly to swing in opposition to the spring 82, if required, in a counterclockwise direction, as viewed in FIG. 3.

As is apparent from FIG. 1, the spacer sleeves 66 of the cutting means 48 have a length greater than those of the cutting means 50 so that a smaller number of cutters spaced from each other by greater distances are provided in the case of the cutting means 48 as contrasted with the cutting means 50.

At its central region each support plate 16 carries a depending T-shaped motion-transmitting member 86 formed in its depending leg with a bore extending upwardly from the bottom end of this leg and receiving a motion-transmitting pin 88. This pin 88 is fixed to and extends upwardly from the conveyor chain 26. Thus, as the chain 26 moves along its endless path each plate 16 will necessarily move therewith along this path. The several plates 16 are maintained at the required elevation by engagement of the rollers 40 and 44 with the rails 34 of the tracks 32. As is apparent from FIG. 1 a plurality of the support plates 16 are distributed along the endless chain 26 and operatively connected thereto to be moved thereby along the endless path, and the distribution of the several support plates 16 is apparent from FIG. 1.

A friction means 90 is situated at the junction 36 between the mutually perpendicular portions 22 and 24 of the path. This friction means 90 takes the form of a block of elastomeric material such as soft rubber, for example. The lower surface of this block engages frictionally the top surface of the glass sheet 14. The block 92 which forms the friction means 90 is carried at its top surface by a suitable holder extending downwardly from a horizontal supporting rod 94 fragmentarily indicated at the upper right portion of FIG. 1. With this friction means 90, after the glass 14 has moved beyond the first cutting means 48, it will be engaged by the friction means 90 so that it will reliably be placed first against the stop means 18 and then against the stop means 20 as the plate 14 approaches and then moves beyond the junction 36.

The apparatus has a pair of removal stations 96 and 98 where operators are situated for removing glass sheets from plates 16 after the sheets have been cut by the pair of cutting means 48 and 50.

As the exposed support plates 16 approach the supply station 10 they pass beneath a stationary brush 100 supported in any suitable way over the plates 16 for engaging the latter and brushing any particles of glass therefrom.

Figure 4:
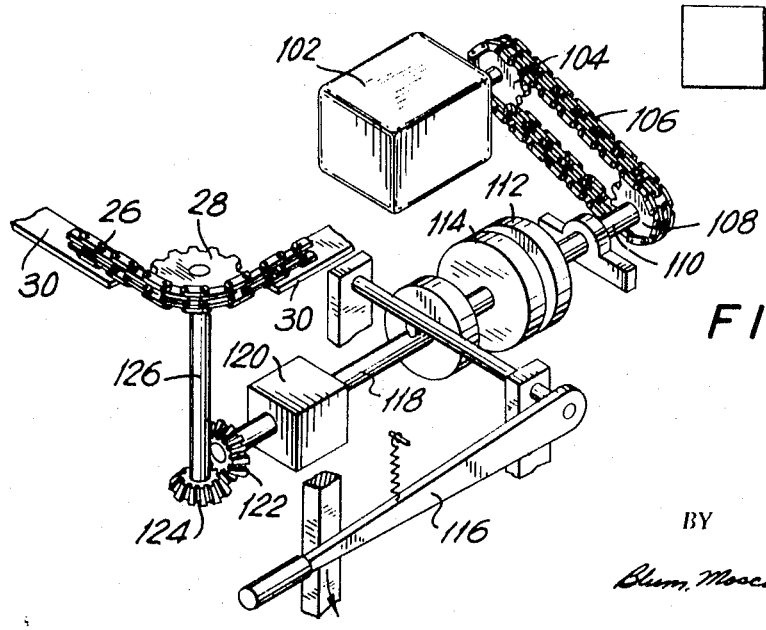
FIG. 4 is a schematic fragmentary perspective illustration of the drive for the conveyor means.

The drive for the endless chain 26 is situated at the region of the supply station 10 so that the operator at the supply station 10 can start and stop the operation of the entire apparatus. This drive includes a driving motor 102 in the form of any suitable electric motor, for example, which through a suitable gear reduction rotates a driving sprocket 104. The rotary driving sprocket 104 drives an endless drive chain 106 which in turn drives a sprocket 108. This sprocket serves to rotate the shaft 110 shown in FIG. 4. Shaft 110 is supported for rotary movement by any suitable bearings and terminates distant from the sprocket 108 in the driving component 112 of a clutch. This clutch has a driven component 114 capable of being displaced into and out of driving engagement with the component 112 by manipulation of the lever 116. Thus, when the operator at the supply station 10 turns the lever 116 to a given position the clutch 112, 114 will be engaged to transmit the drive from the shaft 110 to a driven shaft 118, and the operator can in a well-known manner displace the lever 116 to a stop position for opening the clutch and terminating the transmission of the drive. The shaft 118 through a suitable gear transmission 120 drives a bevel gear 122 which meshes with a second bevel gear 124 which is fixed to the end of a shaft 126 which is fixed to the sprocket 28 located adjacent the supply station 10. Thus, the operator at the supply station 10 can manipulate the lever 116 in order to start the operation of the entire apparatus, and this apparatus will normally continue to operate without interruption as several sheets 14 are successively treated one after the other by the apparatus of the invention.

This apparatus operates in the following manner:

As each plate 16 approaches the supply station 10, the operator will place a sheet 14 on the plate 16 with perpendicular edges of the sheet 14 engaging the stops 18 and 20. The conveyor means will first displace the sheet 14 to the right, as viewed in FIG. 1, along the portion 22 of the path so that the sheet 14 will be cut by the several cutters of the cutting means 48. At this time the trailing edge of the sheet 14 engages the stop means 18 and the sheet is laterally positioned precisely with respect to the cutting means 14 by engagement with the stop 20. Thus, all that the operator at the station 10 has done is to place a sheet 14 on the plate 16 in engagement with the stops 18 and 20, and the apparatus has operated automatically to provide a series of score lines 128 in the sheet 14. These score lines 128 extend parallel to each other and are parallel to the portion 22 of the endless path of movement provided for the several support means 16 by the conveyor means of the invention. As each sheet 14 moves beyond the cutting means 48 toward the junction 36 between the portions 22 and 24 of the endless path, each sheet is frictionally engaged at its upper exposed surface by the friction means 90 which reliably holds the sheet against the stop means 18. As the endless chain 26 passes around the upper right sprocket 28 of FIG. 1, the direction of movement of the plate 16 and the sheet 14 thereon is changed so that the plate 16 and sheet 14 will now move along the path portion 24 which is perpendicular to the path portion 22. Each plate 16 will move together with the plate 14 at the junction 36 through a very slight radius determined by the curvature of the chain as it passes around the sprocket 28. During the initial part of the movement of the plate 16 and the sheet 14 thereon along the path portion 24 the friction means 90 will reliably maintain that edge of the sheet 14 which trails at this time in engagement with the stop 20. Thus, before each sheet arrives at the second means 50 it will be reliably placed in a fully automatic manner by the friction means 90 first in engagement with the stop 18 so as to be reliably positioned laterally with respect to the cutting means 50 and then in engagement with the stop 20 so as to be reliably backed up by the latter during provision of the lines in the top surface of the sheet by the cutting means 50. This cutting means 50 will provide in the sheet a far greater number of score lines than is provided by the cutting means 48, so that the smaller dimensions of the rectangular sections are determined by the cutting means 50 while the longer dimensions thereof are determined by the cutting means 48. As soon as each sheet moves beyond the second cutting means 50 it can be removed by an operator at the removal station 96, or if the operator at the station 96 is occupied the operator at the station 98 can remove the treated sheet. These sheets which have been cut or scored in this way by the pair of cutting means 48 and 50 need only be tapped against a suitable surface so that they will fall apart into the required smaller sections of predetermined rectangular dimensions. Then the several support means 16 without any glass sheets thereon continue to move along the endless path so as to pass beneath and be engaged by the cleaning brush 100 before again reaching the supply station 10 where another sheet is provided thereon.

It will be noted that with this apparatus there is a continuous movement of the glass sheets during the treatment thereof and in fact continuous movement of all of support means 16, so that the apparatus provides a method of the invention according to which the glass sheets 14 are maintained in continuous movement during treatment thereof by the pair of successive cutting means 48 and 50.

Furthermore, it will be noted that in the illustrated example the orientation of each support means 16 never changes. Thus it will be seen that while each plate 16 moves along the successive mutually perpendicular portions of the endless path, each plate 16 does not turn and instead maintains its initial orientation. As a result since the pair of cutting means 48 and 50 have a mutually perpendicular orientation one with respect to the other, the support means 16 and of course the sheet 14 thereon will have with respect to the cutting means 48 an orientation which is perpendicular to its orientation with respect to the cutting means 50, so that in this way mutually perpendicular sets of score lines 128 and 130 are provided.

Thus, according to the method of the invention not only are the sheets 14 maintained in continuous movement while acted upon by the pair of cutting means and during movement between the pair of cutting means, but in addition according to the method of the invention the orientation of the glass sheet does not change in any way since the pair of cutting means are oriented one with respect to the other by an angle of 90°.

As is apparent from FIG. 1 several sheets 14 will be simultaneously at different stages in the process of treatment thereof with the structure of the invention so that exceedingly high output is achieved. At the same time the above-described simple rugged structure of the invention operates very reliably to achieve precisely determined small rectangular sections suitable, for example, for glass slides to carry specimens which are to be placed under a microscope.

What is claimed is:

1. In an apparatus for cutting a sheet of glass into rectangular sections of predetermined size, support means for supporting a sheet of glass which is to be cut into the rectangular sections, conveyor means operatively connected with said support means for conveying the latter along a given path, so that a sheet of glass on said support means will move with the latter along said path, a pair of glass-cutting means situated along said path for cutting along substantially straight lines parallel to each other in the sheet of glass as the latter moves with said support means along said path, said conveyor means, support means, and pair of cutting means all coacting with each other to provide between said support means and one of said cutting means a relative orientation which is perpendicular with respect to the relative orientation between said support means and the other of said cutting means, so that the straight lines cut into the glass by one of said cutting means will be perpendicular to the straight lines cut into the glass by the other of said cutting means, said path having a pair of mutually perpendicular portions, and said pair of cutting means being respectively located along said pair of mutually perpendicular portions of said path, said conveyor means and support means coacting with each other for displacing said support means with respect to said pair of cutting means without changing the orientation of said support means so that it will have with respect to one of the cutting means an orientation which is perpendicular to the orientation which it has with respect to the other of the cutting means, said conveyor means coacting with said support means for conveying the latter continuously along said path, and said path being endless so that said support means moves repeatedly along said path, said conveyor means being in permanent driving engagement with said support means for continuously conveying the latter as long as conveyor means operates.

2. In an apparatus for cutting a sheet of glass into rectangular sections of predetermined size, support means for supporting a sheet of glass which is to be cut into the rectangular sections, conveyor means operatively connected with said support means for conveying the latter along a given path, so that a sheet of glass on said support means will move with the latter along said path, a pair of glass-cutting means situated along said path for cutting along substantially straight lines parallel to each other in the sheet of glass as the latter moves with said support means along said path, said conveyor means, support means, and pair of cutting means all coating with each other to provide between said support means and one of said cutting means a relative orientation which is perpendicular with respect to the relative orientation between said support means and the other of said cutting means, so that the straight lines cut into the glass by one of said cutting means will be perpendicular to the straight lines cut into the glass by the other of said cutting means, said path having a pair of mutually perpendicular portions, and said pair of cutting means being respectively located along said pair of mutually perpendicular portions of said path, said conveyor means and support means coacting with each other for displacing said support means with respect to said pair of cutting means without changing the orientation of said support means so that it will have with respect to one of the cutting means an orientation which is perpendicular to the orientation which it has with respect to the other of the cutting means, said support means having a pair of mutually perpendicular stop means one of which engages a trailing edge of the sheet of glass during movement thereof with said support means along one of said portions of said path and the other of which engages a trailing edge of the sheet of glass during movement thereof with said support means along the other of the portions of said path.

3. The combination of claim 2 and wherein a friction means is situated along the path taken by said support means as the latter moves between the pair of cutting means after the glass has been cut by one of said pair of cutting means but before the glass has been cut by the other of said pair of cutting means for frictionally engaging the sheet of glass to reliably situate the latter against that one of the stop means which engages the trailing edge of the sheet of glass when the latter is cut by the other of said pair of cutting means.

4. In an apparatus for cutting a sheet of glass into rectangular sections of predetermined size, support means for supporting a sheet of glass which is to be cut into the rectangular sections, conveyor means operatively connected with said support means for conveying the latter along a given path, so that a sheet of glass on said support means will move with the latter along said path, a pair of glass cutting means situated along said path for cutting along substantially straight lines parallel to each other in the sheet of glass as the latter moves with said support means along said path, said conveyor means, support means, and pair of cutting means all coacting with each other to provide between said support means and one of said cutting means a relative orientation which is perpendicular with respect to the relative orientation between said support means and the other of said cutting means, so that the straight lines cut into the glass by one of said cutting means will be perpendicular to the straight lines cut into the glass by the other of said cutting means, said path having a pair of mutually perpendicular portions, and said pair of cutting means being respectively located along said pair of mutually perpendicular portions of said path, said conveyor means and support means coacting with each other for displacing said support means with respect to said pair of cutting means without changing the orientation of said support means so that it will have with respect to one of the cutting means an orientation which is perpendicular to the orientation which it has with respect to the other of the cutting means, said conveyor means including a pair of mutually perpendicular tracks respectively situated along said mutually perpendicular portions of said path, and two sets of supporting rollers operatively connected with said support means for supporting the latter on said tracks, the rollers of one set coacting with one of said tracks and being perpendicular to the rollers of the other set, said rollers of said other set coacting with the other of said tracks.

5. The combination of claim 4 and wherein said support means is in the form of a substantially rectangular plate, and a roller of each set being situated substantially beneath a corner of said plate, each of said tracks including a pair of outer rails aligned with side edges of said plate.

6. The combination of claim 5 and wherein said conveyor means includes a chain situated between said rails of said tracks and operatively connected with said plate which forms said support means.

7. The combination of claim 5 and wherein said plate carries a pair of mutually perpendicular stop means for respectively engaging edges of a sheet of glass which respectively trail during movement of the glass along the portions of said path, respectively, and friction means situated at the junction between said portions of said path for reliably maintaining the sheet of glass in engagement with both of said stop means after the sheet of glass has been cut by one of the cutting means but before it has been cut by the other of the cutting means.

8. The combination of claim 7 and wherein said friction means takes the form of a block of elastomeric material frictionally engaging a surface of said sheet of glass which is directed away from the plate of said support means which engages the sheet of glass.

9. In a glass cutting method, the steps of cutting into a surface of glass sheet a first set of parallel score lines and then a second set of parallel score lines perpendicular to the first set, and maintaining the glass sheet in continuous movement during cutting of the two sets of score lines into the sheet, the two sets of score lines being cut by cutting units which are mutually perpendicular one with respect to the other, and maintaining the glass sheet at a predetermined unchanging orientation during its continuous movement with respect to the pair of cutting units.

10. The combination of claim 1 and wherein said path has mutually spaced supply and removal stations where an uncut sheet of glass and a cut sheet of glass are respectively supplied to and removed from said support means, said pair of cutting means both being located along said path between said supply and removal stations.

* * * * *